H. TRUMBULL.
Straw Cutter.
No. 26,062.
Patented Nov. 8, 1859.
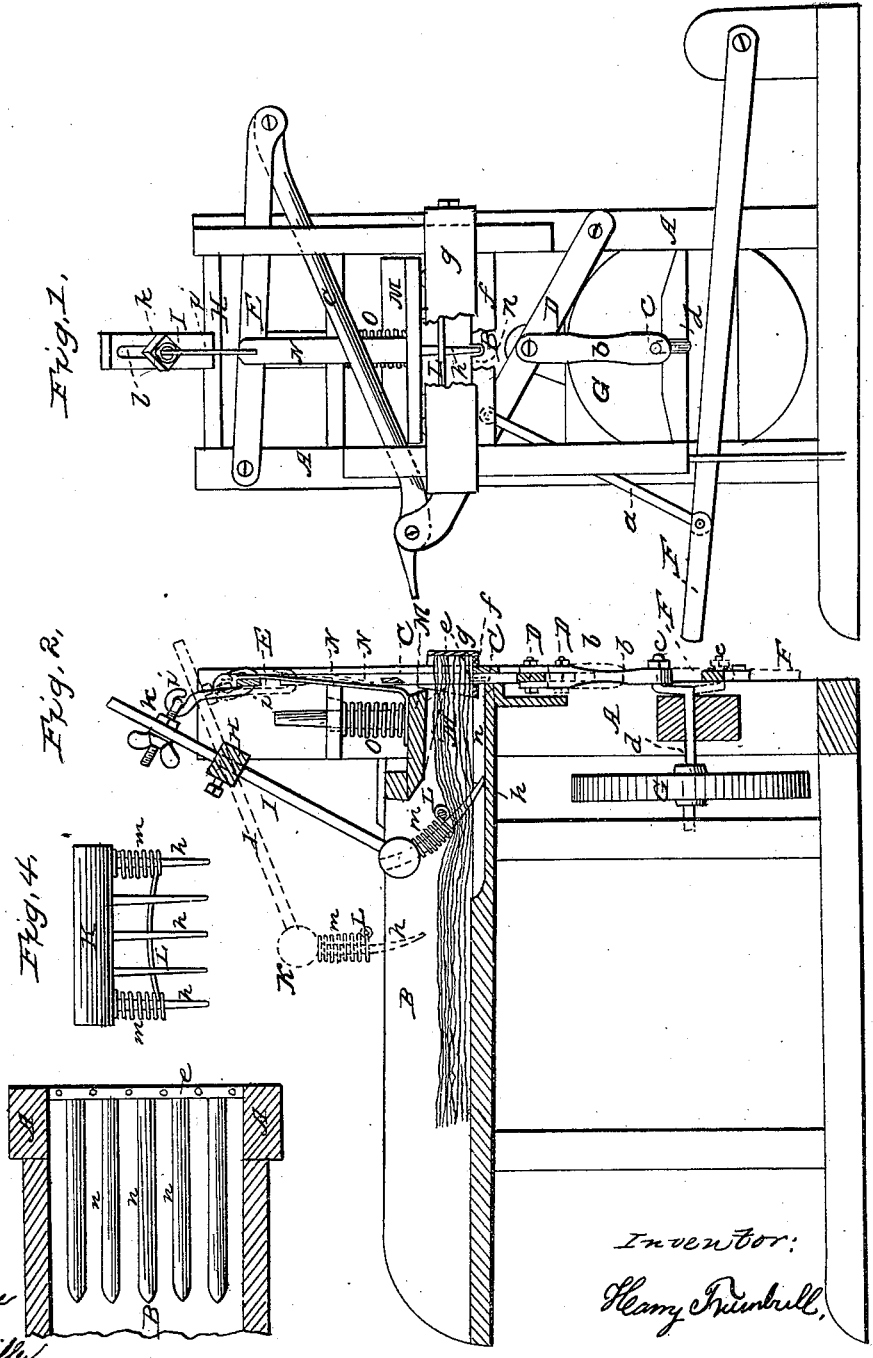

UNITED STATES PATENT OFFICE.

HARVEY TRUMBULL, OF CENTRAL COLLEGE, OHIO.

STRAW-CUTTER.

Specification of Letters Patent No. 26,062, dated November 8, 1859.

*To all whom it may concern:*

Be it known that I, HARVEY TRUMBULL, of Central College, in the county of Franklin and State of Ohio, have invented a new and useful Improvement in Straw-Cutters, of which the following is a full and clear description, reference being had to the accompanying drawing, which forms part of this specification, and in which—

Figure 1 represents a front view of a straw cutting machine constructed according to my improvement; Fig. 2, a longitudinal vertical section thereof; Fig. 3, a sectional plan view of the front portion of the feeding box or hopper; and Fig. 4, a rear view of the rake-head with its teeth and self-adjusting pressure clasp, used in effecting the feed of the straw or material in the hopper.

In the following description I shall only briefly refer to the general construction and arrangement of many of the parts of the straw cutter represented in the accompanying drawing, as these are common and may be varied at pleasure.

My present improvement is more or less immediately connected with the feed of the material in the hopper, and for this purpose I employ an automatic rake to urge forward the straw under a rising and falling pressure cap or piece that coming down retains the straw fed by the rake and holds it firm and compact for the action of the knife.

Wherein my improvement differs from other automatic rake actions or feeding arrangements of the character above referred to will be seen in the following description of details and their action as particularized in the claim or claims at the close.

In the annexed drawing, A represents the frame of the machine, and B the feed box or hopper.

C is the up and down reciprocating knife which is arranged obliquely across the face of the machine and has an advantageous drawing cut or stroke given to it by means of levers, D and E, to which the knife is pivoted at its oposite ends and which levers have their fulcra on opopsite sides of frame-work in front. Motion may be communicated to one of these levers, to operate the knife, either by means of a treadle F, or pulley G, or both; said lever (D) and treadle (F) being connected by a link rod, $a$, and said lever (D) being further connected by a pitman, $b$, with a crank, $c$, of a shaft, $d$, on which the fly pulley G is hung.

Bars or rests, $e$ and $f$, are arranged in front of the feed-box for the straw to rest upon at the place of cut, and between which the reciprocating knife in effecting the cut descends; and an adjustable gage, $g$, is provided yet farther in front to regulate the length or fineness of the cut and to equalize it, as in other straw cutters.

H is the transverse rocking bar of the feeding rake, arranged, as in other automatic rake-feeds to straw cutters, at any suitable height above the feed box, B, and carrying an inclined rake arm, I, provided at its lower end with a rake-head, K having any number of teeth $h$, $h$, $h$, that, as the rocking bar H is worked in one direction, make a curvilinear travel, downward and forward, to urge or feed forward the straw in the box, and that, as the rocking bar H is vibrated in a contrary direction, have a curvilinear travel upwardly and backwardly, as well understood and clearly shown by red and black lines in Fig. 2. The feed and cut are of course alternated and, as the knife descends to cut, the rake rises and recedes, and vice versa. This relative action may be secured by extending the rake arm, I, upward in front of the rocking bar or shaft H, and connecting said extended rake-arm portion with the upper knife lever (E) by, say, a pitman, $i$, and screw clamp, $k$, adjustable along a slot, $l$, in the rake arm so as to give more or less stroke to the rake according to the quantity of straw in the feed box or length of feed required.

To make the rake accommodate itself to both heavy and light loads of straw in the feed-box, as well as all intermediate quantities, and to secure an even or certain feed of the straw whatever be the quantity in the hopper, I provide the rake head or rake teeth with a self adjusting pressure bar or clasp, L, arranged to lie across the teeth of the rake and acted upon by a spiral or other spring or springs ($m$ $m$) wound around the rake teeth or otherwise suitably disposed, so that said clasp, L, is pressed by the spring or springs toward the points or front of the rake teeth, which causes said clasp, as the rake makes its feeding stroke, to be pressed upward toward the rake head by its contact with the straw on which it (said clasp) presses and aids the teeth in their feed of the straw, and, however varying the quantity of straw in the hopper, makes the feed compact and even or certain. Such a contrivance acting in combination with the rake teeth constitutes a variable feeding device of flexible character though the rake arm and teeth be made rigid.

To yet further secure an even or certain action of the rake teeth on the straw in the feed-box and to insure an effective hold and pressing action on the feed along the bottom of the box, I construct the bed of the feed-box with a series of longitudinal grooves, n, n, n, in front, for the pointed portions of the rake teeth to enter and traverse in and along during the forward feeding stroke of the rake, and whereby the rake teeth are allowed to press through and below the whole thickness of feed or body of straw being fed.

The pressing cap or piece, to which I have before referred, for holding the straw after it has been fed under the knife and during the descent or cutting action of the knife, is here shown as consisting of a cap, M, arranged in front over the bed of the feed-box and hung on trunnions or hinged in its rear so as, when up and down, to occupy the positions represented for it in black and red lines in Fig. 2 of the drawing. The general action of this pressing cap, M, is of course alternate with the feed, said cap descending to hold the straw as the rake retires, and vice versa. It is automatic in its action and is raised at the proper interval during the ascent of the knife by a strap, N, connecting it with the upper lever, E, to which the knife is jointed; and is lowered or shut down upon the straw during the descent of the knife, and kept closed the required time, by the action of a spring O, which comes into and remains in play as and during the lifting strap, N, is flexed, as shown by red lines in Fig. 2.

The combination of the pressing cap, M, and self adjusting pressure clasp, L, makes a steady hold on the feed at all times practicable, without retarding the feeding movement, but the pressure and action of the clasp, L, aiding the latter, and, by its reverse action or tendency, preventing the straw from reacting or being drawn back by the rake teeth in retiring, and especially at the commencement of the back movement of the rake when the teeth, as the rake is here shown to operate, have more of a horizontal than upward travel, and till the pressing cap (M) gets its hold.

I would observe that the machine may be operated, if preferred, by a handle attached to an extension of the knife where the latter joins the lower lever (D), or in any other way.

What I claim herein as new and useful, and desire to secure by Letters Patent, is:

The combination of a self-adjusting spring pressure clasp, L, to or with an automatic rake, for the purpose of feeding the material to the knife, substantially as specified.

In testimony whereof, I have hereunto subscribed my name.

HARVEY TRUMBULL.

Witnesses:
  THOS. L. MILLER,
  DANIEL KAHLER.